(12) United States Patent
Niebauer

(10) Patent No.: US 6,554,733 B2
(45) Date of Patent: Apr. 29, 2003

(54) DIFFERENTIAL TRANSMISSION WITH BEVEL GEARS AND METHOD FOR ITS INSTALLATION IN A NON-ROTATING OUTER HOUSING

(75) Inventor: Günter Niebauer, Plochingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/948,913

(22) Filed: Sep. 10, 2001

(65) Prior Publication Data

US 2002/0042321 A1 Apr. 11, 2002

(30) Foreign Application Priority Data

Sep. 14, 2000 (DE) ......................................... 100 45 412

(51) Int. Cl.$^7$ .............................................. F16H 48/06
(52) U.S. Cl. ...................................................... 475/230
(58) Field of Search ............................... 74/606 R, 607; 475/230, 233, 246, 247

(56) References Cited

U.S. PATENT DOCUMENTS

| | | | | |
|---|---|---|---|---|
| 783,168 A | * | 2/1905 | Baker ...................... | 475/247 X |
| 805,567 A | * | 11/1905 | Lindsay ................... | 475/230 X |
| 1,917,469 A | * | 7/1933 | Tapp et al. ............... | 475/247 |
| 2,061,009 A | * | 11/1936 | Rothrock ................. | 475/230 X |
| 2,563,680 A | * | 8/1951 | Hoffman .................. | 475/230 X |
| 2,612,231 A | * | 9/1952 | Bretschneider ........... | 74/607 X |
| 4,733,578 A | * | 3/1988 | Glaze et al. ............. | 475/230 X |
| 4,787,267 A | * | 11/1988 | Kessler et al. ........... | 74/606 R |
| 4,793,211 A | * | 12/1988 | Schmidt .................... | 475/246 |
| 4,914,800 A | * | 4/1990 | Cook ...................... | 475/246 X |
| 5,215,506 A | * | 6/1993 | Hara ........................ | 475/86 |
| 5,273,498 A | * | 12/1993 | Dhillon et al. ............ | 475/230 |
| 5,509,862 A | * | 4/1996 | Sherman ................... | 475/230 |
| 6,443,869 B1 | * | 9/2002 | Schreier et al. .......... | 475/233 |

FOREIGN PATENT DOCUMENTS

DE  195 36 800 A1  4/1996

* cited by examiner

Primary Examiner—Richard M. Lorence
Assistant Examiner—Roger Pang
(74) Attorney, Agent, or Firm—Klaus J. Bach

(57) ABSTRACT

In a differential transmission including a differential transmission casing with planetary bevel gears supported therein so as to be rotatable about an axis normal to a center axis of the transmission casing, and two center gears arranged at opposite sides of, and in meshing engagement with, the planetary bevel gears, the differential transmission casing has at least one end thereof a cylindrical casing extension having an opening which is concentric with the center axis and into which an insert is fitted which has an outer end projecting from the casing extension and forming an annular bearing section for rotatably supporting the differential transmission casing in an outer transmission housing.

14 Claims, 1 Drawing Sheet

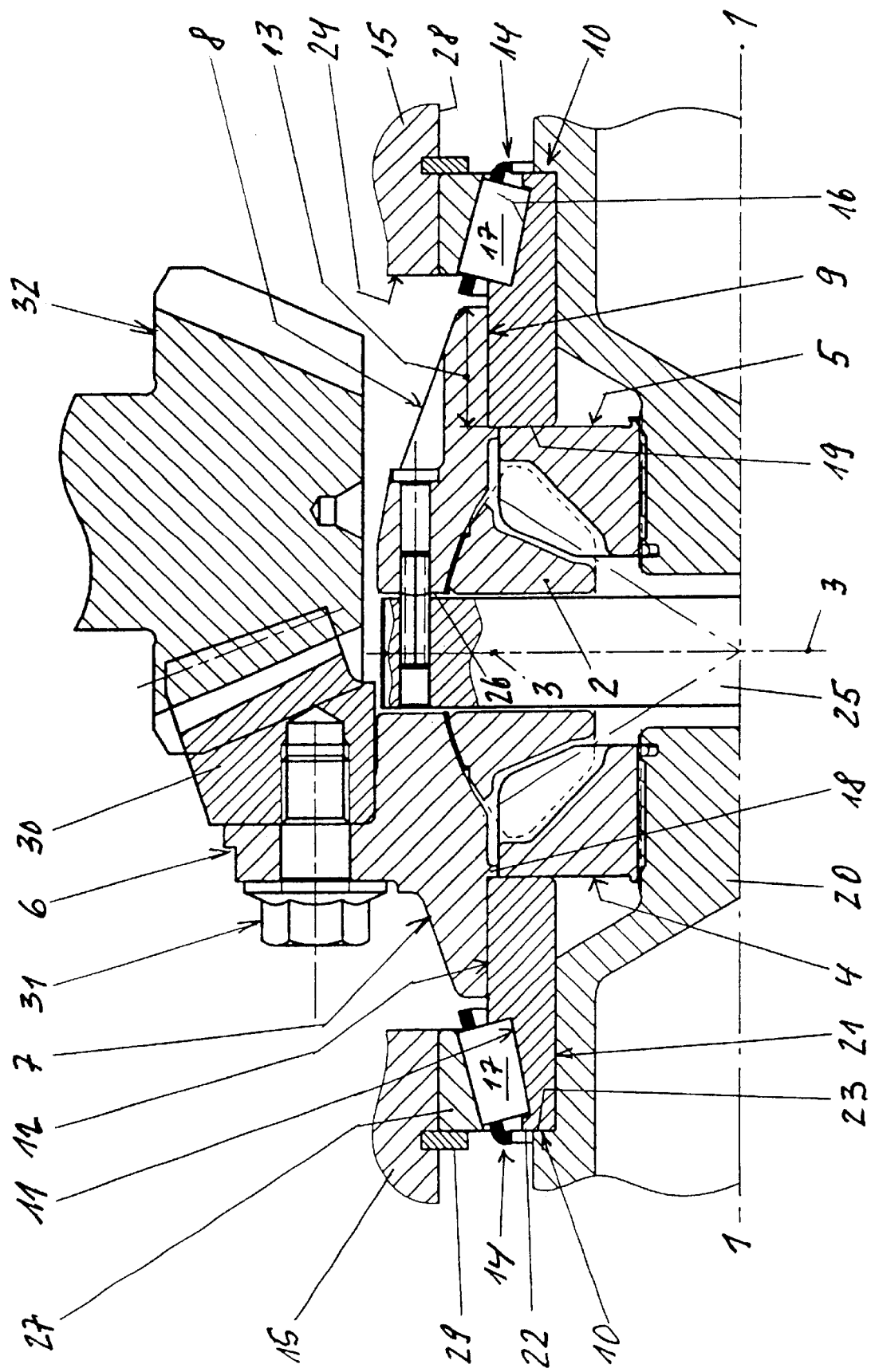

DIFFERENTIAL TRANSMISSION WITH BEVEL GEARS AND METHOD FOR ITS INSTALLATION IN A NON-ROTATING OUTER HOUSING

BACKGROUND OF THE INVENTION

The present invention resides in a differential transmission in bevel gear configuration including at least one planetary gear and opposite center gears, which are in engagement with the planetary gear, that is, rotatably supported about an axis normal to the axis of the center gears in a transmission casing, which encloses the center gears and the planetary gear and is rotatable about the axis of the center gears.

In a known differential transmission in bevel gear configuration as disclosed in DE 195 36 800 A1, the one-piece transmission casing includes bearing necks which extend co-axially with the central axis of the transmission. They are displaced in the direction of the central axis with respect to the adjacent center gear toward the adjacent center gear and supported by a tapered roller bearing on the stationary outer housing. The central opening of the respective bearing neck has an inner diameter, which is only slightly larger than the inner diameter of the adjacent center gear so that this center gear can be axially supported on an inner axial bearing surface of the transmission casing in the direction of the central axis from the axis of rotation of the planetary gear toward the bearing neck. In the central opening of the respective bearing neck, the end portion of the drive shaft, which is rotationally fixed to the adjacent center gear, is rotatably supported by a radial friction bearing. The extension of the mounting opening in the outer housing for the installation of the differential gearing is in the direction of the bearing axis essentially as large as the distance between the axial front faces of the bearing necks as measured in the direction of the central axis so that the rigidity of the outer housing is limited. Furthermore, the bearings of the outer housing must be divided along a housing plane, which includes the bearing axis in order to permit insertion of the differential transmission into the outer housing without substantial tilting. This bearing division further reduces the housing rigidity. Also, the manufacture of the transmission housing is expensive because the inner support and bearing surfaces cannot be formed by drilling but only with the aid of special cutting tools.

It is the object of the present invention to provide a differential transmission, which is relatively simple and easy to assemble, and a method of assembling the transmission.

SUMMARY OF THE INVENTION

In a differential transmission including a differential transmission casing with planetary bevel gears supported therein so as to be rotatable about an axis normal to a center axis of the transmission casing, and two center gears arranged at opposite sides of, and in meshing engagement with, the planetary bevel gears, the differential transmission casing has at least at one end thereof a cylindrical casing extension having an opening which is concentric with the center axis and into which an insert is fitted which has an outer end projecting from the casing extension and forming an annular bearing section for rotatably supporting the differential transmission casing in an outer transmission housing.

With the differential transmission according to the invention, the transmission casing can be manufactured by drilling because of the large openings for the housing inserts. With the method according to the invention, the differential transmission can be installed in the outer housing with ideal parallel orientation of its central axis to the bearing axis of the outer housing by way of the assembly opening of the outer housing without the need for divided bearings.

In the differential transmission according to the invention, the length of the mounting opening in the outer housing in the direction of the bearing axis can be reduced by the respective bearing length that is by the respective length of the bearing section at both housing inserts so that the lengths of transmission casing and of the outer housing are correspondingly reduced. Also, the arrangement is more rigid and the weight of the transmission is reduced.

With the machining of the transmission housing by drilling the establishment of the axial distance between the center gears and the axis of the rotation of the planetary gears is simplified and more accurate.

Each center gear can be axially supported by an axial bearing surface of the transmission casing. The respective center gears can be inserted in a simple manner into the transmission casing by way of the opening accommodating the respective housing extension if the diameter is selected so as to be larger than that of the adjacent center gear. There are no restraints cornering the bearing type and configuration of the bearing section of the housing insert. This may be, as is conventional, a complete anti-friction bearing arrangement for example with a separate inner race ring for supporting the bearing rollers.

The inner race of the bearing may also be provided on the bearing section of the housing insert wherein a coating of a special bearing material may be provided on the housing insert to form the race for the rollers or balls.

With the arrangement according to the invention, the bearing section or, respectively, the whole housing insert may consist of a bearing material so that the inner bearing race can be an integral part of the insert.

The distance of the housing insert from the axes of rotation of the planetary gear may be determined advantageously by a radial projection of the differential casing forming a stop.

Each center gear may abut an axial bearing surface of the respective adjacent housing insert, which is particularly advantageous if the housing insert consists of a hard material. Bearing washers may be eliminated thereby.

The transmission casing may consist of a single part even if four planetary gears are disposed between the center gears. Four planetary gears are often used in differential transmission for commercial vehicles. Even in this case all the planetary gears can be inserted into the casing by way of the openings provided for the extensions of the housing inserts.

The axle shaft, one end of which is mounted on one of the center gears for rotation therewith extends to a vehicle wheel which may be radially supported in the housing insert that is disposed adjacent the respective center gear. In this way, no outside axial forces become effective on the center gear.

The outer transmission housing may include a radial mounting opening for the installation and the support of the transmission casing without the need for providing divided bearings for the outer transmission housing.

For the installation of the transmission casing into the outer housing, the respective installation opening of the outer housing can be narrower in the direction of the bearing axis by at least twice the length of a tapered roller bearing in comparison with a conventional differential transmission, without any deviation from the advantageous parallel orientation of the center axis of the differential transmission with regard to the bearing axis of the outer housing during insertion of the differential transmission through the installation opening.

A particular embodiment of the invention will be described below on the basis of the accompanying drawings.

BRIEF DESCRIPTION OF THE DRAWINGS

The FIGURE is a partial cross-sectional view through a differential transmission when disposed in a non-rotating axle housing cut along a plane which coincides with the center axis 1—1, and which also includes the axis of rotation of the drive pinion.

DESCRIPTION OF A PREFERRED EMBODIMENT

A transmission casing 6, which encloses two planetary gears 2 and two center gears 4 and 5 consists of a single part. It is supported by two anti-friction bearing arrangements 14 in an axle (outer) housing 15 of a vehicle drive axle so as to be rotatable around a geometric center axis 1—1 but immovable in axial direction. The common bearing axis of the anti-friction bearing arrangements 14 coincides with the center axis I—I of the differential transmission when installed in the axle housing 15.

The axis of rotation 3—3 of the planetary gears 2 is defined by a bearing bolt 25, which is firmly supported in axially aligned bores 26 of the transmission casing 6 and extends normal to the center axis 1—1.

The anti-friction bearing arrangements 14 are in the form of tapered roller bearings whose outer race rings 27 are received in corresponding single part bearing support openings 28 of the outer housing 15. The outer race rings 27 are fixed in place in axial direction so as to prevent their movement away from the axis of rotation 3—3 of the planetary gears 2 by a lock ring 29 received in an annular groove formed into the wall of the support opening 28.

The transmission casing 6 includes two casing extensions 7 and 8, which are concentric with the center axis 1—1 and which project axially in the direction away from the axis of rotation 3—3 of the planetary gears 2 and toward the respective tapered roller bearing 14. The casing extensions 7 and 8 extend axially beyond the respective center gears 4 and 5, respectively, and include cylindrical openings 9 for receiving sleeve-like housing inserts 10 whose outer diameters are larger than the outer diameter of the adjacent center gears 4 or, respectively, 5.

At its outer circumference, each casing insert 10 includes a bearing section 11, which is disposed outside the transmission casing 6, and a cylindrical mounting section 12. The mounting section 12 forms a pressure fit 13 in the cylindrical opening 9 so that the insert 10 is firmly connected to the transmission casing 6.

The casing insert 10 consists of a hard bearing material and is provided at the outer surface of the bearing section 11 with a conical inner race 16 for the tapered bearing rollers 17.

At its end adjacent the axis of rotation 3—3 of the planetary gears 2, each casing insert 10 is provided with an axial thrust bearing surface 19 for axially supporting the respective adjacent center gear 4 or 5.

Each casing insert 10 is supported in the direction toward the axis of rotation 3—3 of the planetary gears 2 by a shoulder 18 of the transmission casing 6 forming a stop.

An end 20 of a drive shaft is supported in the opening 21 of the respective casing insert 10 so as to be rotatable therewith. The other end of the drive shaft is connected to a wheel of a vehicle and may include a constant velocity joint. The end 20 of the drive shaft is axially supported with respect to the adjacent casing insert 10 in the direction toward the axis of rotation 3—3 of the planetary gears 2 by axial thrust bearing surfaces 22, 23.

At its outer circumference, the transmission casing 6 carries a spur bevel gear 30, which is arranged concentric with the center axis 1—1 and is firmly connected to the transmission casing 6 by bolts for rotation with the transmission casing 6. It is driven by a bevel gear 32.

The bearing openings 28 for the outer race rings 27 of the tapered rollers 17 extend in the direction toward the axis of rotation 3—3 of the planetary gears 2 of the center axis 1—1 up to a radial mounting opening 24 of the outer (axle) housing 15. In the direction of the center axis 1—1, this opening is only slightly larger than the corresponding distance between the axially outer end faces of the housing extensions 7 and 8 of the transmission casing 6.

For the installation of the differential transmission into the axle housing 15, the differential transmission is first pre-assembled—including the spur bevel gear 30—except for the casing inserts 10.

Then the partially pre-assembled differential transmission is inserted into the axle or outer housing 15 through the mounting opening 24 in an orientation parallel to the bearing axis of the bearing openings 28.

Subsequently, the casing inserts 10 are pressed into the respective support openings 9.

Then the tapered roller bearings 14 can be installed.

What is claimed is:

1. A differential transmission in eve gear configuration comprising:
    a differential transmission casing supported so as to be rotatable about a center axis,
    at least one planetary bevel gear supported in said casing so as to be rotatable about a planetary gear axis which extends normal to said center axis,
    two center gears, which have outer diameters and are supported in said casing (6) rotatably about said center axis and disposed at opposite sides of, and in meshing engagement with said at least one planetary bevel gear,
    said differential transmission casing having, at least at one side thereof, a cylindrical casing extension arranged concentrically with said center axis and extending outwardly away from said planetary gear axis,
    said cylindrical casing extension having a casing opening which is concentric with the center axis and which has an inner diameter larger than the outer diameter of said center gears to permit insertion of said center gears into said transmission casing through said casing opening and a tubular casing insert fitted into said casing opening so as to be firmly engaged therein, said tubular casing insert having an axially outer end projecting from said casing extension and including an annular bearing section for rotatably supporting said differential transmission casing.

2. A differential transmission according to claim 1, wherein said annular bearing section of said tubular casing insert is rotatably supported in a stationary outer housing by an anti-friction bearing arrangement and is axially fixed thereby.

3. A differential transmission according to claim 2, wherein the annular bearing section of said tubular casing insert is provided with a race surface for supporting rollers of said anti-friction bearing.

4. A differential transmission according to claim 3, wherein said race surface is formed integrally with said tubular casing insert.

5. A differential transmission according to claim 1, wherein said differential transmission casing is provided with a shoulder forming an axial stop axially engaging said tubular casing insert.

6. A differential transmission according to claim 1, wherein said differential transmission casing is a single piece component.

7. A differential transmission according to claim 1, wherein a center gear is firmly connected to a drive shaft, which is rotatably supported in said tubular casing insert.

8. A differential transmission according to claim 7, wherein said drive shaft is axially supported by an axial thrust bearing surface formed at the axially outer end face of said tubular casing insert.

9. A differential transmission according to claim 2, wherein said outer stationary housing includes an installation opening permitting insertion of said differential transmission casing.

10. A differential transmission in bevel gear configuration comprising:
   a differential transmission casing supported so as to be rotatable about a center axis,
   at least one planetary bevel gear supported in said casing so as to be rotatable about a planetary gear axis which extends normal to said center axis,
   two center gears supported in said casing rotatably about said center axis and disposed at opposite sides of, and in meshing engagement with, said at least one planetary bevel gear,
   said differential transmission casing having, at least at one side thereof, a cylindrical casing extension arranged concentrically with said center axis and extending outwardly away from said planetary gear axis,
   said cylindrical casing extension having a casing opening which is concentric with the center axis and a tubular casing insert fitted into said casing opening so as to be firmly engaged therein, said tubular casing insert having an axially outer end projecting from said casing extension and including an annular bearing section for rotatably supporting said differential transmission casing and said tubular casing insert further having at its inner axial end an axial end surface on which an adjacent center gear is axially supported.

11. A differential transmission according to claim 10, wherein said annular bearing section of said tubular casing insert is rotatably supported in a stationary outer housing by an anti-friction bearing arrangement and is axially fixed thereby.

12. A differential transmission according to claim 10, wherein a center gear is firmly connected to a drive shaft, which is rotatably supported in said tubular casing insert.

13. A differential transmission according to claim 12, wherein said drive shaft is axially supported by an axial thrust bearing surface formed at the axially outer end face of said tubular casing insert.

14. A differential transmission according to claim 11, wherein said outer stationary housing includes an installation opening permitting insertion of said differential transmission casing.

* * * * *